Patented Feb. 6, 1940

2,189,380

UNITED STATES PATENT OFFICE 2,189,380

PROCESS OF PREPARING DRIED EGG ALBUMIN

Verne D. Littlefield, Beverly Hills, Calif., assignor to Armour and Company, Chicago, Ill., a corporation of Illinois No Drawing. Application August 10, 1937, Serial No. 158,430

11 Claims. (Cl. 260—122)

This invention relates to processes of preparing dried egg albumin and it comprises processes wherein raw egg whites are acidified until the pH thereof lies between about 4.5 and 5.0, the precipitate thus formed therein filtered, the clear egg whites neutralized if desired, and then dried.

At the present time there are no wholly satisfactory methods available for the preparation of substantially pure egg albumin. There are many reasons for this. The source of this material is, of course, egg whites. But egg whites are aqueous colloidal solutions containing many complex materials. The whites, as initially obtained, are relatively viscous liquids containing proteinaceous substances to which the thick condition of the whites can be attributed. In addition, the raw whites will contain chalazae, stringy portions, etc. Such complex materials are prone to undergo fermentation and putrefaction. When acidified in accordance with prior art methods prior to drying, gelatinous or flocculent precipitates which are removed only with difficulty are obtained. So far as I am aware, no one has been able hitherto to remove from the white other protein substances so as to leave an aqueous thin solution of substantially pure albumin which can be dried to give a substantially pure dried albumin. Although such pure albumins are of little or no use for the purpose of preparing so-called "reconstituted egg whites", they are of great utility in many industrial fields where egg albumin has been used. Such fields are adhesives, plastics, films, and the like.

The present invention relates to ways of preparing dried egg albumin which is substantially free of proteins other than albumin. The invention further relates to ways by which these proteins and other extraneous substances can actually be filtered from the aqueous albumin solution. This is something which the prior art has almost uniformly considered impossible of achievement because of the gelatinous, slimy nature of any flocculent precipitate formed in an egg white solution.

My invention is based on the discovery of certain relationships between the pH value of the egg white solution and the character of the precipitate of gelatinous or flocculent materials formed therein when the egg white is acidified. And I have discovered that when the raw egg whites are acidified to a pH of about 4.75, the actual operable range being 4.5 to 5.0, the proteins other than albumin therein will precipitate as a filterable sludge, and that such filtration can be markedly facilitated by the use of filter aids added directly to the acidified egg white. At a pH of 4.75 the amount of filter aid necessary is at a minimum. The amount increases as the pH increases to 5.0 and beyond 5.0 it is virtually impossible to filter the precipitate regardless of the quantity of filter aid added. Likewise, as the pH decreases below 4.75 the amount of filter aid necessary increases until a pH of 4.5 is reached, and below this value the precipitate cannot be filtered off.

Obviously, the reasons for the peculiar function of the pH value are obscure. Possibly the acid added "dehydrates" the proteins other than the albumin. Many simpler protein materials, such as gelatin, have an isoelectric point at which their degree of hydration is reduced to a minimum. But how this would be affected by large quantities of albumin is uncertain. It is surprising that the albumin itself does not appear to dehydrate by the addition of acid. And it is equally surprising that in spite of the large amounts of albumin present the precipitate of other protein constituents is such that it can be readily filtered when aided by a filter aid. Much more than the mere functioning of a filter aid seems to be occurring because at pH values above 5.0 the flocculent precipitate will settle but cannot be filtered even when a filter aid is added. If the filter aid alone were facilitating the filtration, it would be obvious that it would absorb a gelatinous precipitate from a solution at a pH of 5.0 or higher as well as at a pH of 4.7. Yet the facts are that at pH values greater than 5.0 a filter aid is of no help in obtaining a filterable mass of suspended solids.

Consequently, my invention is predicated on the discovery that when egg whites are acidified to a pH of 4.5 to 5.0, and a filter aid added, I can filter the precipitate of suspended solids in an ordinary plate and frame filter press, or in a continuous rotary filter, and that the clear filtrate is substantially free of all proteins with the exception of albumin. The filtrate is a sparkling, clear liquid and, if desired, its brilliancy can be further enhanced by treating it with an activated carbon such as the many decolorizing carbons available for decolorizing liquids.

As acidifying agents I can use any suitable acid, either inorganic or organic. Hydrochloric acid is the best because, during the final drying operation, the hydrochloric acid is volatilized so that the dried product is neutral. Other acids I can use are sulfuric, phosphoric, citric, tartaric and the like. Obviously the acid should have no decomposing effect on the albumin. The only function of the acid is that of adjusting the hydrogen ion concentration of the egg white to values stated. After filtration of the precipitate the clear filtrate can be directly dried, as by spray drying, pan drying, and the like, or it can be first neutralized with a suitable alkaline material such as ammonium hydroxide, alkali metal hydroxides, and alkali metal carbonates.

I shall now describe my process in greater detail. The eggs are first candled to exclude those in which bacterial decomposition has occurred, and then the eggs are cracked and the whites separated from the yolks. The whites need not be immediately processed for they can be thawed frozen egg whites or partially fermented egg whites. If desired, any scum formed during fermentation can be first separated off, although this is not necessary. The whites, while liquid, are strained through a filter to remove bits of shell, chalazae, stringy portions and the like, and the raw whites finally collected in a large vat. These vats may hold as much as 15,000 pounds of egg white. Advantageously the temperature of the whites is maintained at 45° to 50° F. to inhibit bacterial decomposition, but the time the whites are in bulk in my process is so short that no opportunity for fermentation is given even at ordinary room temperature.

To the 15,000 pound charge of whites I then add about 6 pounds of hydrochloric acid (specific gravity 1.18) for each 1,000 pounds of whites. The acid is best diluted with 5 to 10 volumes of water before addition to the whites, and the whites and acid are thoroughly agitated. The stated quantities will reduce the pH of most whites to about 4.75, but it is best to measure the pH of egg whites as the acid is added. The pH should not be more than 5.0 and not less than 4.5. When this range is reached a filter aid is added, the mixture thoroughly agitated, and then pumped to a plate and frame filter press.

There are many filter aids which I can use. Most of them are finely powdered siliceous materials such as silica gel, diatomaceous earth, fuller's earth, adsorbent clays, and the like. Ordinarily one and one-half percent by weight of filter aid is enough. More can be used, but to no advantage. Those skilled in the art will have no difficulty in judging the proper quantity of filter aid. Enough should be used so that the filtrate comes through clear.

Ordinary plate and frame filter presses work very well, and as an additional expedient I can pre-coat the filter areas with a filter aid in ways well known. When the filter cloths are pre-coated with filter aid I need not add filter aid to the bulk of the acidified egg white, but for best results the filter aid is directly added to the egg white. The filter cake composed of filter aid and precipitate can be used as a fertilizer since it is high in nitrogen.

A decolorizing carbon can be added to the acidified egg white along with the filter aid if desired. This gives an extremely brilliant sparkling filtrate which, when dried, gives an egg albumin of unusually high quality.

The clear filtrate can be sent directly to the driers, advantageously a spray drier which is operated in the usual way for drying egg products. The operating conditions are thoroughly understood in the art. As stated, when acids other than hydrochloric are used it is best to neutralize the clear filtrate before drying, but if small amounts of tartaric acid, for example, are unobjectionable in the final product the filtrate need not be neutralized. The uses to which the albumin is to be put will govern neutralization. Although egg white acidified with hydrochloric acid can also be neutralized prior to drying this step is not necessary since during the drying operation the hydrochloric acid is driven off.

Collection of egg whites, acidification thereof, and filtration are best conducted at temperatures of about 45° to 50° F. so that no putrefaction can occur. However, the treatment time in my process is so short that relatively little danger of putrefaction arises even if the egg whites are processed at ordinary room temperature (about 70° F.). For some uses, a dried egg albumin of slight odor may not be objectionable so I do not wish to be limited to working at relatively cool temperatures. Rather my invention is primarily directed to ways of treating raw egg whites so that materials other than egg albumin can be precipitated and filtered therefrom and thus obtain a filtrate substantially free of other proteins, gelatinous materials and the like.

Likewise, I need not necessarily filter the raw egg whites prior to acidification. The raw whites can be directly acidified in which case chalazae and stringy portions will form a part of the filterable precipitate.

The pH range of 4.5 to 5.0 is a critical range permitting no variation therefrom if a substantially pure albumin is desired. The amount of acid required to effect this pH value in the egg white may vary slightly. Some acids ionize to a lesser degree than others, so the pH of the acidified whites is best checked by direct hydrogen ion determinations.

Although I have referred more specifically to ordinary filtration of the acidified egg whites, I can, of course, separate the precipitate from the aqueous albumin in a centrifuge or by simple settling.

Having thus described my invention, what I claim is:

1. In the process of preparing dried egg albumin from raw egg whites the method of obtaining a filterable precipitate of substances other than egg albumin which comprises acidifying the egg whites to a pH of between 4.5 and 5.0.

2. In the process of preparing dried egg albumin from raw egg whites, the method of obtaining a filterable precipitate of substances other than egg albumin which comprises acidifying the egg whites to a pH of between 4.5 and 5.0 with hydrochloric acid.

3. The process of treating raw egg whites which comprises acidifying the whites until the pH thereof lies between 4.5 and 5.0, adding a filter aid to the whites, and filtering.

4. The process of treating raw egg whites which comprises acidifying the whites with hydrochloric acid until the pH thereof lies between 4.5 and 5.0, adding a filter aid to the whites, and filtering.

5. The process which comprises filtering raw egg whites in the presence of a filter aid while the whites are at a pH of 4.5 to 5.0.

6. The process of preparing a dried substantially pure egg albumin which comprises straining raw egg whites to remove chalazae and stringy portions therefrom acidifying the whites until the pH thereof lies between 4.5 and 5.0, filtering the whites in the presence of a filter aid, and drying the filtrate.

7. The process of preparing a dried substantially pure egg albumin which comprises straining the raw egg whites to remove chalazae and stringy portions therefrom, adding hydrochloric acid to the whites until the pH thereof lies between 4.5 and 5.0, filtering the whites in the presence of a filter aid, and spray drying the filtrate.

8. The process of preparing a dried substantially pure egg albumin which comprises acidifying raw egg whites to a pH of 4.5 to 5.0, filtering the precipitate thus formed in the presence of a filter aid, and drying the filtrate.

9. The process of preparing a dried egg albumin which comprises adding hydrochloric acid to raw egg whites until the pH thereof lies between 4.5 and 5.0, filtering the precipitate thus formed in the presence of a filter aid, and drying the filtrate.

10. The process of preparing a substantially pure egg albumin which comprises acidifying raw egg whites to a pH of between 4.5 to 5.0, filtering the acidified whites in the presence of a filter aid, neutralizing the filtrate and drying the neutralized filtrate.

11. The process of preparing an egg albumin which comprises acidifying raw egg whites at a temperature of about 45° to 50° F. until the pH thereof lies between 4.5 and 5.0, filtering the acidified whites in the presence of a filter aid while at a temperature of about 45° to 50° and drying the filtrate.

VERNE D. LITTLEFIELD.